United States Patent
Kanemaru et al.

(10) Patent No.: US 9,925,622 B2
(45) Date of Patent: Mar. 27, 2018

(54) HYBRID WELDING METHOD AND WELDING TORCH FOR HYBRID WELDING

(71) Applicant: TAIYO NIPPON SANSO CORPORATION, Tokyo (JP)

(72) Inventors: Shuhei Kanemaru, Tokyo (JP); Tomoaki Sasaki, Tokyo (JP); Toyoyuki Sato, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 585 days.

(21) Appl. No.: 14/377,332

(22) PCT Filed: Feb. 8, 2013

(86) PCT No.: PCT/JP2013/053048
§ 371 (c)(1),
(2) Date: Aug. 7, 2014

(87) PCT Pub. No.: WO2013/118865
PCT Pub. Date: Aug. 15, 2013

(65) Prior Publication Data
US 2015/0001185 A1    Jan. 1, 2015

(30) Foreign Application Priority Data

Feb. 8, 2012    (JP) .................................. 2012-025030

(51) Int. Cl.
*B23K 35/38*    (2006.01)
*B23K 28/02*    (2014.01)
(Continued)

(52) U.S. Cl.
CPC ................ *B23K 28/02* (2013.01); *B23K 9/16* (2013.01); *B23K 9/167* (2013.01); *B23K 9/1675* (2013.01);
(Continued)

(58) Field of Classification Search
CPC .......... B23K 28/02; B23K 9/16; B23K 9/167; B23K 9/1675; B23K 9/173; B23K 9/1735; B23K 9/291; B23K 9/295; B23K 9/296
(Continued)

(56) References Cited

U.S. PATENT DOCUMENTS 4,291,220 A * 9/1981 Lessmann ............ B23K 9/1735
219/137 R
6,693,252 B2 * 2/2004 Zhang .................. B23K 9/1068
219/121.45
(Continued)

FOREIGN PATENT DOCUMENTS

JP    52-37981    9/1977
JP    53-34653    3/1978
(Continued)

OTHER PUBLICATIONS

International Search Report for PCT/JP2013/053048 dated Apr. 16, 2013.
(Continued)

*Primary Examiner* — Arthur O Hall
*Assistant Examiner* — Adam J Rogers
(74) *Attorney, Agent, or Firm* — Nixon & Vanderhye P.C.

(57) ABSTRACT

A hybrid welding method capable of improving arc stability and improving the welding speed and the welding efficiency is provided. A hybrid welding method includes generating a TIG arc on a leading side in a welding direction and generating a MIG arc on a trailing side in the welding direction to weld a base metal, in which a TIG current is set to be higher than a MIG current so as to continuously generate arcs in a TIG electrode and a MIG electrode, and an absolute value of a distance from an intersection between a central axis of the TIG electrode and a surface of the base
(Continued)

metal to an intersection between a central axis of the MIG electrode and the surface of the base metal is 20 mm or less.

18 Claims, 6 Drawing Sheets

(51) Int. Cl.
| | | |
|---|---|---|
| *B23K 9/167* | (2006.01) | |
| *B23K 9/173* | (2006.01) | |
| *B23K 9/16* | (2006.01) | |
| *B23K 9/29* | (2006.01) | |

(52) U.S. Cl.
CPC ............ *B23K 9/173* (2013.01); *B23K 9/1735* (2013.01); *B23K 9/291* (2013.01); *B23K 9/295* (2013.01); *B23K 9/296* (2013.01)

(58) Field of Classification Search
USPC .......................................................... 219/75
See application file for complete search history.

(56) References Cited

U.S. PATENT DOCUMENTS

| | | | | |
|---|---|---|---|---|
| 2003/0183604 A1* | 10/2003 | Zhang | ................. | B23K 9/1068 219/121.45 |
| 2005/0199593 A1* | 9/2005 | Ignatchenko | .......... | B23K 9/173 219/121.45 |
| 2007/0145028 A1* | 6/2007 | Artelsmair | ........... | B23K 9/1675 219/137.71 |
| 2010/0326962 A1* | 12/2010 | Calla | .................... | B23K 9/0956 219/76.14 |
| 2011/0132878 A1* | 6/2011 | Wang | ................. | B23K 26/1423 219/74 |
| 2011/0174784 A1* | 7/2011 | Kamei | ..................... | B23K 1/14 219/74 |
| 2012/0006795 A1* | 1/2012 | Nowak | ................. | B23K 9/173 219/121.64 |
| 2012/0061364 A1* | 3/2012 | Purslow | ................. | B23K 9/123 219/137.62 |
| 2013/0140280 A1* | 6/2013 | Biskup | ................... | B23K 9/025 219/74 |
| 2013/0299463 A1* | 11/2013 | Kanemaru | ............. | B23K 9/167 219/74 |
| 2015/0108095 A1* | 4/2015 | Kruer | ..................... | B23K 9/167 219/74 |

FOREIGN PATENT DOCUMENTS

| | | |
|---|---|---|
| JP | A-53-034653 | 3/1978 |
| JP | 58-3791 | 1/1983 |
| JP | 58-9283 U | 1/1983 |
| JP | A-58-003791 | 1/1983 |
| JP | 59-27779 | 2/1984 |
| JP | A-59-027779 | 2/1984 |
| JP | 60-92084 | 5/1985 |
| JP | A-60-092084 | 5/1985 |
| JP | U-A-60-146576 | 9/1985 |
| JP | 61-283465 | 12/1986 |
| JP | A-61-283465 | 12/1986 |
| JP | 1-109380 U | 7/1989 |
| JP | A-06-079466 | 3/1994 |
| JP | 2001-353575 | 12/2001 |
| JP | A-2001-353575 | 12/2001 |
| JP | 2004-351463 | 12/2004 |
| WO | WO 2008/016084 | 2/2008 |
| WO | WO 2012017913 A1 * | 2/2012 ............. B23K 9/167 |

OTHER PUBLICATIONS

Written Opinion of the International Searching Authority for PCT/JP2013/053048 dated Apr. 16, 2013.
"Microfilm of the Specification and Drawings Annexed to he Request of Japanese Utility Model Application No. 33547/1984", Mitsubishi Heavy Industries, Ltd., Sep. 28, 1985.
Japanese Office Action issued in Application No. 2012-025030 dated May 26, 2015 (with partial translation).

* cited by examiner $I_p$ : PEAK CURRENT
$I_b$ : BASE CURRENT
$f$ : FREQUENCY

HYBRID WELDING METHOD AND WELDING TORCH FOR HYBRID WELDING

TECHNICAL FIELD

This application is the U.S. national phase of International Application No. PCT/JP2013/053048 filed 8 Feb. 2013 which designated the U.S., claiming priority to Japanese Patent Application No. 2012-025030, filed Feb. 8, 2012, the entire contents of each of which is incorporated herein by reference.

BACKGROUND ART

A TIG (Tungsten Inert Gas) welding method in which an arc is generated between a non-consumable tungsten electrode and a workpiece in an inert gas atmosphere has been widely used because a high-quality welded part is obtained. However, as compared to other welding methods such as a MAG (Metal Active Gas) welding method or a MIG (Metal Inert Gas) welding method, the TIG welding method has problems in that the welding speed is slow and the welding efficiency is decreased.

On the other hand, the MAG welding method and the MIG welding methods are welding methods in which an arc is generated between a consumable welding wire electrode and a workpiece in an active gas atmosphere and in an inert gas atmosphere, respectively. These methods have a higher welding efficiency than that of the TIG welding method as described above but have a problem in that spatter is likely to occur. Further, the MAG welding method has a problem in that the toughness of weld metal is likely to be decreased.

Here, the reason why spatter is likely to occur in the MAG welding method and the MIG welding method is that short-circuiting is likely to occur between a distal end of a welding wire electrode and a base metal. In addition, the reason why the toughness is likely to be decreased in the MAG welding method is that oxidized gas in a shielding gas is melted in weld metal and the amount of oxygen in the weld metal is increased.

In order to compensate for the problems of the methods, various TIG-MIG hybrid welding methods have been proposed (for example, PATENT DOCUMENT 1).

When the MIG welding method is carried out on carbon steel or stainless steel using inert gas such as argon or helium as a shielding gas, a cathode spot is not fixed and an arc is unstable.

In contrast, in the TIG-MIG hybrid welding method, metal vapor is generated by the leading TIG arc, and electric current flow is formed in the metal vapor. In such a case, a molten pool generated by the TIG arc has a lower work function than solid metal and easily discharges electrons. Therefore, the cathode spot of the MIG arc is easily fixed to the molten pool.

Therefore, with the TIG-MIG hybrid welding method, carbon steel or stainless steel can be stably welded in inert gas used as a shielding gas, and the amount of oxygen dissolved in the weld metal can be decreased. In addition, in the TIG-MIG hybrid welding method, when a wire of a MIG welding electrode is about to come into contact with base metal, a distal end of the wire is melted and separated as a droplet by the heating action of a TIG arc. Therefore, short-circuiting does not occur between the wire and the base metal and spatter can be prevented.

As described above, the TIG-MIG hybrid welding method can compensate for the problems of TIG welding and MAG (or MIG) welding but has a unique problem due to its property of arc rigidity. Here, the arc rigidity refers to the property in which, even when an electrode is inclined, an arc is likely to be generated straight in an extending direction of a tungsten electrode or a wire. In the TIG-MIG hybrid welding method, since a TIG arc and a MIG arc, which have current flowing directions opposite each other, are generated close to each other, arc repulsion is generated by an electromagnetic force.

As a result, the TIG-MIG hybrid welding method of the related art has a problem in that an arc is likely to be unstable due to arc rigidity and arc repulsion which work in different directions. When the arc is unstable, there is a problem in that a weld bead is irregular and a blow hole is likely to be formed.

Incidentally, in order to decrease the arc repulsion in the TIG-MIG hybrid welding method of the related art, a hot-wire TIG welding method has been used (for example, PATENT DOCUMENT 2).

FIG. 12 illustrates a conventional hot-wire TIG welding method. As illustrated in FIG. 12, in the hot-wire TIG welding method, an arc is not generated from a wire, and welding is carried out using resistance heating caused by allowing a current to flow through the wire. As a result, a MIG arc disappears and arc repulsion does not occur. Therefore, arc stability can be improved.

Therefore, in a wire heating power source of the hot-wire TIG welding method, the voltage is controlled to be low (for example, 6 V to 7 V), unlike in a MIG welding power source of the TIG-MIG hybrid welding method in which the voltage is controlled to be high (for example 13 V to 30 V) in order to generate an arc between a wire and base metal.

PATENT DOCUMENT 1: Japanese Unexamined Patent Application, First Publication No. S53-34653

PATENT DOCUMENT 2: Japanese Unexamined Patent Application, First Publication No. H6-79466

SUMMARY OF THE INVENTION

However, in the hot-wire TIG arc welding method of the related art disclosed in PATENT DOCUMENT 2, as described above, the voltage in a MIG welding side is low. Therefore, the wire heating power is lower than that of the TIG-MIG hybrid welding method of the related art, and there is a problem in that the melting rate of the wire is decreased. In addition, there is a problem in that heat input is small and weld penetration is shallow. As described above, in the hot-wire TIG arc welding method of the related art, the improvement of welding speed and welding efficiency is desired.

Further, the TIG-MIG hybrid welding method of the related art has a problem in that a welded part is likely to be oxidized because a shielding gas flow is likely to be turbulent due to the collision of plasma flows discharged from a TIG arc and a MIG arc.

The present invention has been made in consideration of the above-described circumstances, and an object thereof is to provide: a hybrid welding method capable of improving arc stability, improving the welding speed and the welding efficiency, and obtaining a non-oxidized superior welded part; and a welding torch for hybrid welding which is used in the hybrid welding method.

In order to solve the above-described problems, according to the present invention, the following aspects can be provided.

(1) A hybrid welding method including generating a TIG arc on a leading side in a welding direction and generating a MIG arc on a trailing side in the welding direction to weld a base metal, in which a TIG current is set to be higher than a MIG current so as to continuously generate arcs in a TIG electrode and a MIG electrode, and an absolute value of a distance from an intersection between a central axis of the TIG electrode and a surface of the base metal to an intersection between a central axis of the MIG electrode and the surface of the base metal is 20 mm or less.

(2) The hybrid welding method according to (1), in which the TIG electrode and the MIG electrode are disposed inside a nozzle main body, a distance from a lower end of the nozzle main body to the surface of the base metal is maintained to be 25 mm or less, and the TIG arc and the MIG arc are generated while blowing a shielding gas from the lower end of the nozzle main body to the surface of the base metal.

(3) The hybrid welding method according to (2), in which in the nozzle main body, the shielding gas is supplied from a base end side to a distal end side of each of the TIG electrode and the MIG electrode along the TIG electrode and the MIG electrode.

(4) The hybrid welding method according to (2) or (3), in which the TIG electrode and the MIG electrode are disposed inside one nozzle main body.

(5) The hybrid welding method according to (2) or (3), in which the TIG electrode and the MIG electrode are disposed inside different nozzle main bodies.

(6) The hybrid welding method according to any one of (1) to (5), in which as the shielding gas, gas containing 25% or more of He and a balance of argon gas is used.

(7) The hybrid welding method according to any one of (1) to (5), in which as the shielding gas, gas containing 3% to 9% of hydrogen and a balance of argon gas is used.

(8) The hybrid welding method according to any one of (1) to (5), in which as the shielding gas, gas containing 3% to 9% of hydrogen, 25% or more of He, and a balance of argon gas is used.

(9) The hybrid welding method according to any one of (1) to (5), in which as the shielding gas, gas containing 3% to 9% of hydrogen and a balance of helium gas is used.

(10) The hybrid welding method according to any one of (2) to (9), in which the same kind of shielding gas is used for the TIG arc and the MIG arc.

(11) The hybrid welding method according to any one of (2) to (9), in which different kinds of shielding gases are used for the TIG arc and the MIG arc.

(12) The hybrid welding method according to any one of (1) to (11), in which the base metal is welded while covering a welded part, which is formed on the surface of the base metal, with a shielding member which is provided to surround a part or the entire periphery of the nozzle main body.

(13) The hybrid welding method according to (12), in which the base metal is welded while blowing the shielding gas of the hybrid welding method according to any one of (6) to (9) to the surface of the base metal between the nozzle main body and the shielding member.

(14) The hybrid welding method according to (12) and (13), in which a distance from a lower end of the shielding member to the surface of the base metal is maintained to be 15 mm or less.

(15) The hybrid welding method according to any one of (1) to (14), in which a total angle ($|\alpha|+|\beta|$) of a torch angle $\alpha$ and a torch angle $\beta$ is in a range of 30° to 120°, the torch angle $\alpha$ being an angle formed between a central axis of a TIG welding torch and a normal line of the base metal when a base end side of the TIG welding torch is inclined toward a traveling direction with respect to a welding direction, the torch angle $\beta$ being an angle formed between a central axis of a MIG welding torch and a normal line of the base metal when a base end side of the MIG welding torch is inclined toward a side opposite the traveling direction with respect to the welding direction.

(16) The hybrid welding method according to any one of (1) to (15), in which a pulsed current is added to trailing MIG welding.

(17) A welding torch for hybrid welding used in the hybrid welding method according to any one of (1) to (16), the welding torch including: a TIG electrode; a MIG electrode that is provided on a trailing side of the TIG electrode in a welding direction; and a nozzle main body in which the TIG electrode and the MIG electrode are accommodated, in which a distance from a lower end of the nozzle main body to a surface of base metal is 25 mm or less.

(18) The welding torch for hybrid welding according to (17), in which a flow path of a shielding gas for a TIG arc and a flow path of a shielding gas for a MIG arc are provided inside the nozzle main body.

(19) The welding torch for hybrid welding according to (17) or (18), further including a shielding member that is provided to surround a part or the entire periphery of the nozzle main body, in which a distance from a lower end of the shielding member to the surface of the base metal, which ranges between the nozzle main body and the shielding member, is 15 mm or less.

(20) The welding torch for hybrid welding according to any one of (17) to (19), in which the shielding member is provided with a shielding gas blowing portion to protect a welded part formed on the surface of the base metal.

According to the hybrid welding method of the present invention, when arcs are continuously generated in a TIG electrode and a MIG electrode to weld base metal, a TIG current is set to be higher than a MIG current, and thus a cathode spot region of a trailing MIG arc is not formed to be larger than a molten pool where a leading TIG arc is formed. Therefore, an arc is not likely to be unstable and arc stability can be improved.

In addition, when the thickness of base metal which is a welding target is large, both TIG and MIG currents can be increased. Therefore, the welding speed and the welding efficiency can be improved.

In addition, according to the hybrid welding method of the present invention, an absolute value of a distance from an intersection between a central axis of the TIG electrode and a surface of the base metal to an intersection between a central axis of the MIG electrode and the surface of the base metal is 20 mm or less. In an overlapping portion of arcs formed by generating two arcs close to each other as described above, electromagnetic forces are canceled, and thus a total electromagnetic force is decreased, and the action of the arc rigidity is relatively increased. Therefore, arc stability can be improved.

Further, according to the hybrid welding method of the present invention, a distance from a lower end of the nozzle main body to the surface of the base metal is maintained to be 25 mm or less, and the TIG arc and the MIG arc are generated while blowing a shielding gas from the lower end of the nozzle main body to the surface of the base metal. Therefore, a welded part formed on the surface of the base metal can be efficiently protected by the shielding gas. As a result, a non-oxidized superior welded part can be obtained even in TIG-MIG hybrid welding in which a shielding gas flow is likely to be turbulent due to the collision of plasma flows discharged from both TIG and MIG arcs.

In addition, according to another hybrid welding method of the present invention, when arcs are continuously generated in a TIG electrode and a MIG electrode to weld base metal, a TIG current is set to be higher than a MIG current, and as the shielding gas, gas containing 25% or more of He and a balance of argon gas is used. By setting a TIG current to be higher than a MIG current, a cathode spot region of a trailing MIG arc is not formed to be larger than a molten pool where a leading TIG arc is formed. In addition, since helium and $H_2$ in the shielding gas have high thermal conductivity, an arc is cooled. Due to the thermal pinch effect caused by the above configuration, a current path is concentrated on the center of an arc column and the arc is shrunk in a region immediately close to the base metal. Therefore, the arc rigidity is increased, and the action of the arc rigidity becomes relatively stronger than the action of the arc repulsion. Accordingly, arc stability can be improved.

Further, according to another hybrid welding method of the present invention, the base metal is welded while covering a welded part, which is formed on the surface of the base metal, with a shielding member which is provided to surround a part or the entire periphery of the nozzle main body. Therefore, a non-oxidized superior welded part can be obtained even in TIG-MIG hybrid welding in which a shielding gas flow is likely to be turbulent due to the collision of plasma flows discharged from both TIG and MIG arcs.

According to the welding torch for hybrid welding of the present invention, a nozzle main body in which the TIG electrode and the MIG electrode are accommodated is provided. By disposing the TIG electrode and the MIG electrode inside the nozzle main body, a shielding gas can be commonly used by a TIG arc and a MIG arc. As a result, for a TIG arc and a MIG arc, it is not necessary to use different kinds of shielding gases, and one kind of shielding gas can be commonly used. Therefore, the size of the welding torch can be reduced. In addition, by integrating two nozzles into one nozzle, the flow rate of a shielding gas can be reduced.

In addition, according to the welding torch for hybrid welding of the present invention, a distance from a lower end of the nozzle main body to a surface of the base metal is 25 mm or less. As a result, a welded part formed on the surface of the base metal can be efficiently protected by the shielding gas. Therefore, a non-oxidized superior welded part can be obtained even in TIG-MIG hybrid welding in which a shielding gas flow is likely to be turbulent due to the collision of plasma flows discharged from both TIG and MIG arcs.

DETAIL DESCRIPTION OF THE INVENTION

Figure 1A:
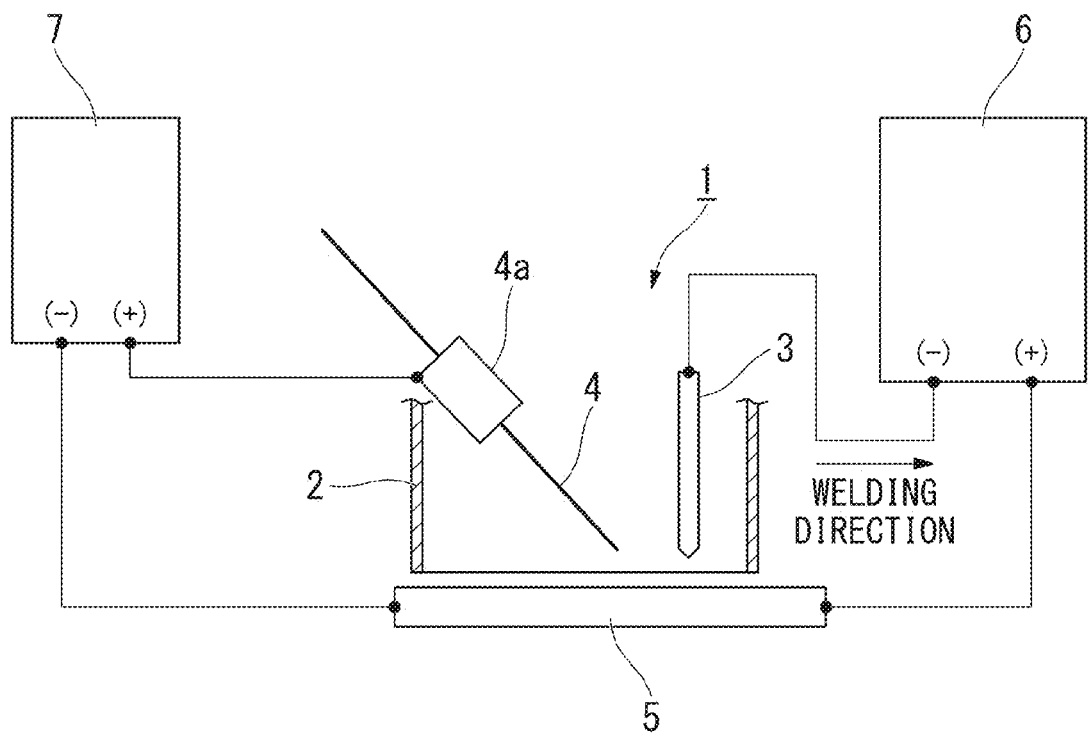
FIG. 1A is a schematic configuration diagram illustrating an example of a gas-welding apparatus including a welding torch used in a first embodiment to which a hybrid welding method according to the present invention is applied.

Hereinafter, a hybrid welding method according to an embodiment of the present invention will be described in detail using the accompanying drawings and a welding apparatus including a welding torch for hybrid welding used in the hybrid welding method. In the drawings used in the following description, a characteristic portion may be enlarged for convenience of easy understanding of the characteristics, and the dimensional ratio of each component may be different from the real ratio.

First Embodiment

Figure 1B:
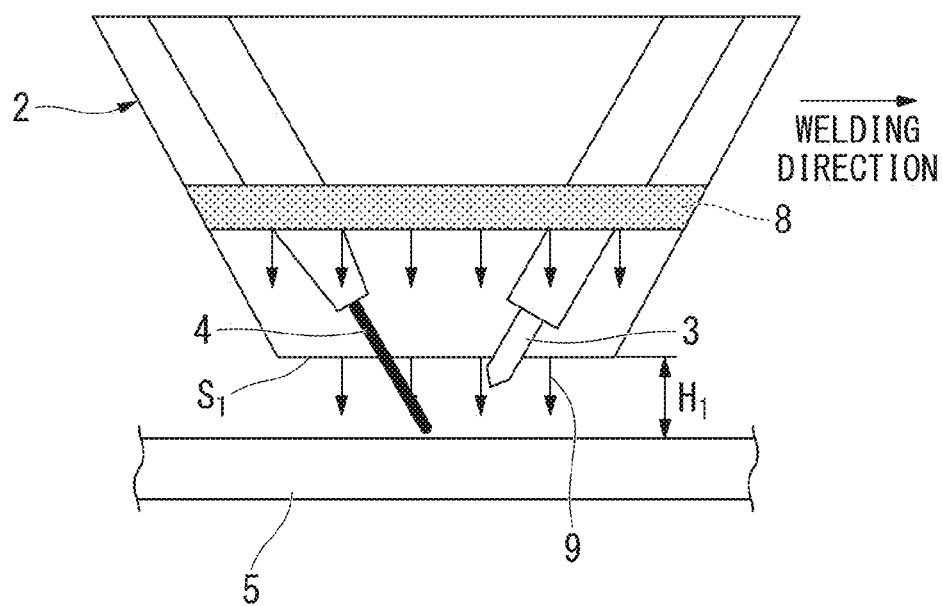
FIG. 1B is an enlarged view illustrating a distal end portion of a nozzle main body used in the first embodiment to which the hybrid welding method according to the present invention is applied.

FIGS. 1A and 1B are schematic configuration diagrams illustrating a welding apparatus used in a hybrid welding method according to a first embodiment of the present invention. In FIG. 1A, reference numeral 1 represents a welding torch (welding torch for hybrid welding). Roughly, this welding torch 1 includes: a nozzle main body 2 that is a cylindrical member; a rod-shaped tungsten electrode 3 that is disposed inside the nozzle main body 2 on a leading side in a welding direction; a welding wire 4 that is disposed inside the nozzle main body 2 on a trailing side in the welding direction; and a contact tip 4a that allows a current to flow through the welding wire 4.

In addition, this welding torch 1 has a single structure in which only one kind of shielding gas is used. Further, a welding apparatus according to this embodiment includes: a welding power source 6 that applies a welding current (TIG current) between the tungsten electrode 3 and base metal 5 to generate a TIG arc; and a welding power source 7 that applies a welding current (MIG current) between the welding wire 4 and the base metal 5 to generate a MIG arc.

As illustrated in FIG. 1B, a shielding gas blowing portion 8 is provided on a distal end side of the nozzle main body 2 of the welding torch 1. This shielding gas blowing portion 8 is connected to a shielding gas supply source (not illustrated) in which a shielding gas is stored. The shielding gas is supplied from the shielding gas supply source to the shielding gas blowing portion 8 and is blown (reference numeral 9) from the distal end of the nozzle main body 2 to the base metal 5 which is a workpiece.

Here, the flow rate of the shielding gas 9 blown from the distal end of the nozzle main body 2 to the base metal 5 which is a workpiece is preferably in a range of 0.2 to 2 (m/sec). It is not preferable that the flow rate be lower than 0.2 (m/sec) because a turbulent flow generated by plasma flow collision is predominant in TIG-MIG hybrid welding in which a gas flow is likely to be turbulent due to the collision of plasma flows discharged from both TIG and MIG arcs, external air is introduced thereinto, and a welded part is oxidized.

On the other hand, it is also not preferable that the flow rate be higher than 2 (m/sec) because the shielding gas flow becomes turbulent due to an excessively high flow rate, external air is introduced thereinto, and a welded part is oxidized.

On the other hand, when the flow rate is in the above-described range, as illustrated in FIG. 1B, a distance $H_1$ from the lower end of the nozzle main body 2 to the surface of the base metal 5 can be controlled to be 25 mm or less (in other words, under a condition that the flow rate of the shielding gas is in the appropriate range, the distance $H_1$ can be controlled to be 25 mm or less.) By widening the allowable range of the distance $H_1$ from the lower end of the nozzle main body 2 to the base metal 5, the strict alignment of the welding torch 1 is not necessary before welding. In addition, even if there are convex-concave portions or steps on the surface of the base metal 5, the base metal can be welded without a problem.

When the opening space of the lower end portion of the nozzle main body 2 is used as an area $S_1$ of a gas blowing surface as illustrated in FIG. 1B, specific examples of the gas flow volume and the gas flow rate are shown in Table 1 below.

TABLE 1

| Shielding Gas System | Area of Gas Blowing Surface $S_1$ (mm$^2$) | Gas Flow Volume (L/min) | Gas Flow Rate (m/sec) |
| --- | --- | --- | --- |
| Blowing Portion 8 | 820 | 10 to 100 | 0.2 to 2 |

As the shielding gas according to the embodiment, inert gas such as argon (Ar) or helium (He) can be used, but gas containing 25% or more of helium (He) and a balance of argon (Ar) gas is preferably used. Here, when the gas containing 25% or more of helium (He) and a balance of argon (Ar) gas is used as the shielding gas, the helium has high thermal conductivity and thus an arc is cooled. Due to the thermal pinch effect caused by the above configuration, a current path is concentrated on the center of an arc column and the arc is shrunk in a region immediately close to the base metal 5. Therefore, the arc rigidity is increased, and the action of the arc rigidity becomes relatively stronger than the action of the arc repulsion, and thus arc stability is improved.

In addition, even when 3% to 9% of hydrogen gas is added to argon gas, helium gas, or mixed gas of argon and helium, the same effects can be obtained. Since hydrogen gas is a flammable gas, hydrogen gas has a risk of explosion and is difficult to handle. The upper limit of the amount of hydrogen gas added is set as 9% in consideration of an explosion range in a case where mixed gas of hydrogen and nitrogen gas is diluted with air.

The base metal 5 according to the embodiment is not particularly limited and can be applied to various materials. Specific examples of the base metal 5 include nickel alloys, aluminum, magnesium-based materials, copper-based materials, and steel-based materials such as stainless steel and carbon steel. Among these, the base metal 5 according to the embodiment is preferably applied to steel materials of the related art in which there is a problem in welding such as TIG welding or MAG welding.

The tungsten electrode 3 of the welding torch 1 is connected to a negative terminal of the welding power source 6, and a welding current is applied between the tungsten electrode 3 and the base metal 5 connected to a positive terminal of the welding power source 6 to generate a TIG arc on the surface of the base metal 5.

Figure 2:
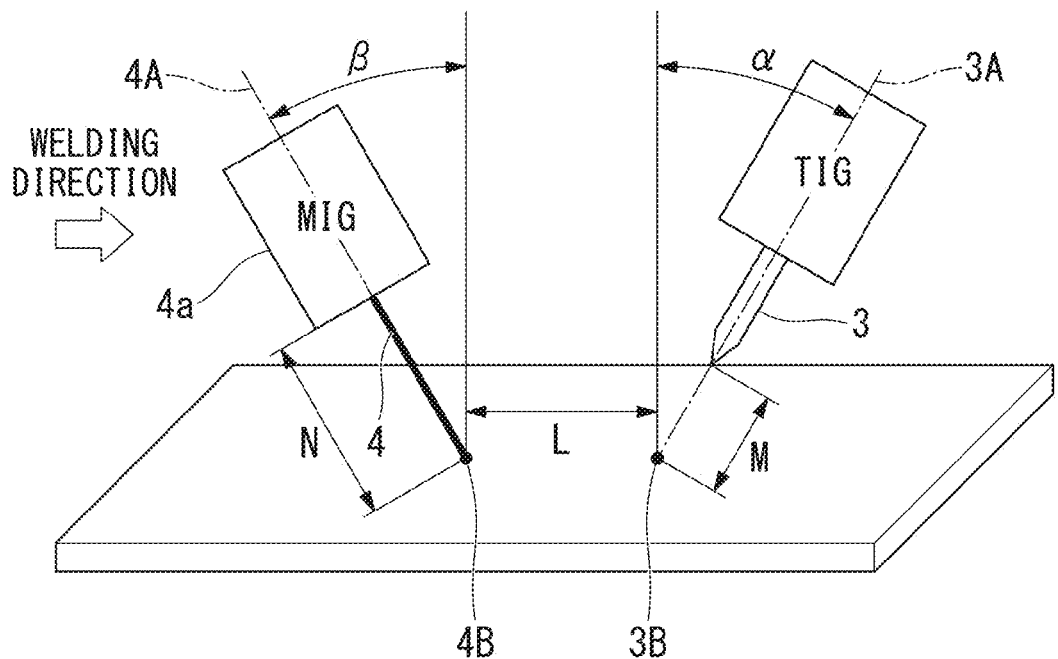
FIG. 2 is an enlarged view illustrating a welding torch portion of a gas-welding apparatus used in the hybrid welding method according to the present invention.

Here, as illustrated in FIG. 2, an angle α formed between a central axis 3A of the tungsten electrode (TIG electrode) 3 and a normal line of the base metal may be inclined toward a traveling direction with respect to a welding direction.

In addition, a TIG arc length M is not particularly limited and can be appropriately selected depending on the kind and thickness of the base metal 5. Specifically, the TIG arc length M is preferably in a range of 2 mm to 20 mm.

The welding wire 4 is not particularly limited and can be appropriately selected depending on the material of the base metal, such as a solid wire or a metal flux cored wire, which is a welding target. In addition, the welding wire 4 is inserted into an inner hole provided in the contact tip 4a and can be supplied from a distal end of the welding torch 1 to the outside. The contact tip 4a is connected to a positive terminal of the welding power source 7, and a welding current is applied between the contact tip 4a and the base metal 5 connected to a negative terminal of the welding power source 7 to generate a MIG arc on the surface of the base metal 5.

Here, as illustrated in FIG. 2, an angle β formed between a central axis 4A of the welding wire (MIG electrode) 4 and a normal line of the base metal may be inclined toward a side opposite the traveling direction with respect to the welding direction.

A total angle (|α|+|β|) of the angle α formed between the central axis 3A of the tungsten electrode and a normal line of the base metal and the angle β formed between the central axis 4A of the welding wire and a normal line of the base metal is preferably in a range of 30° to 120°. When arcs are generated close to each other as described above, an overlapping portion of the arcs is generated. In the overlapping portion of the arcs, electromagnetic forces are canceled, and thus a total electromagnetic force is decreased, and the action of the arc rigidity is relatively increased. Therefore, arc stability is improved. In order to avoid the contact between the workpiece and the welding torch, the upper limit of the total angle is set as 120°.

In addition, a projection length N of the welding wire 4 is not particularly limited and can be appropriately selected depending on the kind and thickness of the base metal 5. Specifically, the projection length N of the welding wire 4 is preferably in a range of 10 mm to 30 mm.

In the welding torch 1 according to the embodiment, when a distance from an intersection 3B between the central axis 3A of the tungsten electrode (TIG electrode) 3 and the surface of the base metal 5 to an intersection 4B between the central axis 4A of the welding wire (MIG electrode) 4 and the surface of the base metal 5 is defined as an inter-arc distance L, an absolute value of the inter-arc distance L is set to be 20 mm or less.

Here, the absolute value of the inter-arc distance L can be applied not only to a case where the intersection 3B of the leading TIG is closer to the traveling direction side of the welding direction than the intersection 4B of the trailing MIG as illustrated in FIG. 2 but also to a case where the intersection 4B of the trailing MIG is closer to the traveling direction side of the welding direction than the intersection 3B of the leading TIG.

The shape of the distal end of the nozzle main body 2 in the welding torch 1 according to the embodiment is not particularly limited. Specifically, when the nozzle main body 2 is seen in a cross-sectional view, front and back walls may be perpendicular to the welding direction as illustrated in FIG. 1A, or the front and back walls may be inclined to the same degree as the inclinations of the tungsten electrode (TIG electrode) 3 and the welding wire (MIG electrode) 4 with respect to the welding direction as illustrated in FIG. 1B, respectively.

Next, the hybrid welding method in which the welding apparatus is used will be described.

First, the shielding gas is supplied from the shielding gas supply source (not illustrated) to the welding torch 1 (shielding gas blowing portion 8 provided in the nozzle main body 2). The flow rate of the shielding gas 9 blown from the distal end of the nozzle main body 2 to the base metal 5 which is a workpiece is controlled to be in a range of 0.2 to 2 (m/sec), and the height of the welding torch 1 is controlled such that the distance $H_1$ from the lower end of the nozzle main body 2 to the surface of the base metal 5 is 25 mm or less. Next, TIG arcs are continuously generated by operating the welding power source 6 to apply a welding current (TIG current) between the tungsten electrode 3 and the base metal 5, and MIG arcs are continuously generated by operating the welding power source 7 to apply a welding current (MIG current) between the welding wire 4 and the base metal 5, thereby welding the base metal.

Figure 3:
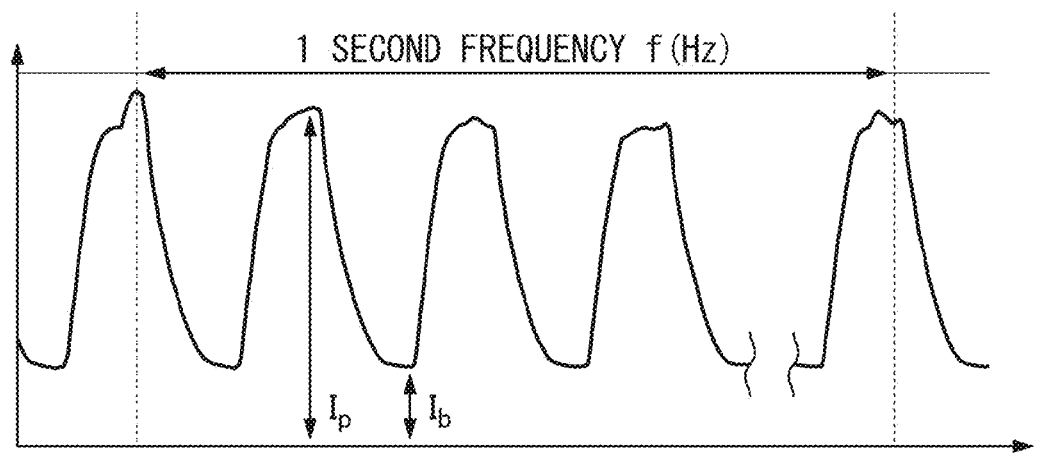
FIG. 3 is a diagram illustrating a waveform, a current change, and a frequency of MIG welding which are applicable to the hybrid welding method according to the present invention.

A non-pulsed waveform may be used in a welding current (MIG current) added to the trailing MIG welding, but a pulsed current may also be added thereto as illustrated in FIG. 3 and Table 2. By adding the pulsed current to the trailing MIG welding, an arc becomes stable due to an increase in the rigidity of the trailing MIG, and a satisfactory bead appearance can be obtained.

TABLE 2

| Peak Current (Ip) | 280 to 500 (A) |
|---|---|
| Base Current (Ib) | 60 to 80 (A) |
| Frequency (f) | 40 to 140 (Hz) |

In such a hybrid welding method using the leading TIG welding and the trailing MIG welding, the surface of the base metal 5 is heated and melted to form a molten pool by the leading TIG arc, and a cathode spot of the trailing MIG arc is formed in this molten pool.

Incidentally, in order to improve the welding speed and the welding efficiency, as the thickness of the base metal 5 which is a workpiece is increased, both the TIG and MIG currents are required to be increased. Accordingly, in the hybrid welding method according to the embodiment, first, the TIG current is set to be high. As this TIG current is increased, the amount of metal vapor generated between the welding torch 1 and the base metal 5 is increased and the area of the molten pool formed on the surface of the base metal 5 is increased.

Next, the MIG current is set to be high. At this time, in the hybrid welding method according to the embodiment, a value of the MIG current is set not to exceed a set value of the TIG current (that is, the TIG current is set to be higher than the MIG current).

Incidentally, when a value of the current (MIG current) of the trailing MIG arc is higher than a value of the current (TIG current) of the leading TIG arc, a bead shape (specifically, a bead toe) is unstable. Specifically, as the trailing MIG current is increased, the MIG arc is increased and the welding speed is improved. However, when a value of the leading TIG current is lower than a value of the trailing MIG current, the area of the molten pool which is formed by the TIG arc on the surface of the base metal 5 is decreased, and the spread of the MIG arc is larger than the width of the molten pool. As a result, the MIG arc of a portion protruding from the molten pool is unstable, the meandering of a bead is likely to occur. In addition, when the molten pool formed by the TIG arc is narrowed, the width of the spread of the trailing MIG arc is limited, and thus the wettability of a bead is decreased.

On the other hand, according to the hybrid welding method of the embodiment, a TIG current is set to be higher than a MIG current. Therefore, a cathode spot region of a trailing MIG arc is not formed to be larger than a molten pool where a leading TIG arc is formed. Therefore, an arc is not likely to be unstable and arc stability can be improved. In addition, when the thickness of base metal which is a welding target is large, both the TIG and MIG currents can be increased. Therefore, the welding speed and the welding efficiency can be improved.

Further, in the hybrid welding method according to the embodiment, as illustrated in FIG. 2, the absolute value of the inter-arc distance L, which is the distance from the intersection 3B between the central axis 3A of the tungsten electrode (TIG electrode) 3 and the surface of the base metal 5 to the intersection 4B between the central axis 4A of the welding wire (MIG electrode) 4 and the surface of the base metal 5, is set to be 20 mm or less.

Incidentally, when the absolute value of the inter-arc distance is more than 20 mm, an overlapping portion of the TIG arc and the MIG arc is not formed, a high electromagnetic force is applied thereto, and thus the arcs are unstable. In addition, during the passage of the MIG arc, the supply of the metal vapor produced between the welding torch 1 and the base metal 5 and the molten pool formed on the surface of the base metal 5 is insufficient, and thus the arcs are likely to be unstable. As a result, the bead shape (bead toe) is unstable.

On the other hand, according to the hybrid welding method of the embodiment, the absolute value of the inter-arc distance L is set to be 20 mm or less, and both the TIG arc and the MIG arc are generated close to each other. As a result, an overlapping portion of the arcs is formed. In this overlapping portion, electromagnetic forces are canceled, and thus a total electromagnetic force is decreased, and the action of the arc rigidity becomes relatively stronger than the action of the arc repulsion. Accordingly, arc stability is improved.

In addition, when both the arcs are generated close to each other, during the passage of the MIG arc, the supply of the metal vapor produced between the welding torch 1 and the base metal 5 and the molten pool formed on the surface of the base metal 5 is sufficient, and arc stability is improved.

Further, according to the hybrid welding method of the embodiment, the distance H from the lower end of the nozzle main body 2 to the surface of the base metal 5 is maintained to be 25 mm or less, and the TIG arc and the MIG arc are generated while blowing a shielding gas from the lower end of the nozzle main body 2 to the surface of the base metal 5. As a result, a non-oxidized superior welded part can be obtained even in TIG-MIG hybrid welding in which a shielding gas flow is likely to be turbulent due to the collision of plasma flows discharged from both TIG and MIG arcs.

Further, according to the hybrid welding method of the embodiment, a welded part formed on the surface of the base metal 5 can be efficiently protected by the shielding gas. As a result, external influences on the welded part can be reduced, and arc stability can be improved.

The welded part is oxidized by being exposed to atmospheric components along with the movement of the torch. It is preferable that the oxidation of the welded part be prevented by providing a box in a direction opposite the traveling direction of the nozzle main body 2 and supplying an after-shielding gas thereto.

It is preferable that components of the after-shielding gas be the same as those of the shielding gas, but even if the components are different, the effect of preventing the oxidation can be expected.

Modification Example of First Embodiment

In the hybrid welding method according to the first embodiment, gas containing 25% or more of He and a balance of argon gas is used as the shielding gas. Since helium in the shielding gas has high thermal conductivity, an arc is cooled. Due to the thermal pinch effect caused by the above configuration, a current path is concentrated on the center of an arc column and the arc is shrunk in a region immediately close to the base metal. Therefore, the arc rigidity is increased, and the action of the arc rigidity becomes relatively stronger than the action of the arc repulsion. Accordingly, the arc stability can be improved.
(Verification Test 1)

In a welding torch, the leading TIG electrode and the trailing MIG electrode were disposed in one nozzle main body, and the inclination angle of the leading TIG electrode was set as α and the inclination angle of the trailing MIG electrode was set to β. Using a welding apparatus including the welding torch, base metal formed of common stainless steel (SUS304) was welded. As welding conditions, conditions shown in Table 3 were used. In addition, the results of a bead appearance inspection which vary depending on a relationship with the distance from the lower end of the nozzle main body and the base metal are shown in Table 4.

TABLE 3

| Leading TIG Current | 380 A |
| Trailing MIG Current | 310 A |
| Welding Speed | 30 cm/min |
| Inter-Arc Distance L | 4 mm |
| Kind of Shielding Gas | Ar |
| Flow Volume of Shielding Gas | 10 to 100 L/min |
| Flow Rate of Shielding Gas | 0.2 to 2.0 m/min |
| Distance From Nozzle Lower End to Base Metal Surface | 2 to 30 mm |
| TIG Arc Length M | 5 mm |
| Torch Angle α | 30° (Traveling Direction Side of Welding Direction is Positive Side) |

TABLE 3-continued

| Torch Angle β | −30° (Traveling Direction Side of Welding Direction is Positive Side) |

TABLE 4

Figure 4:
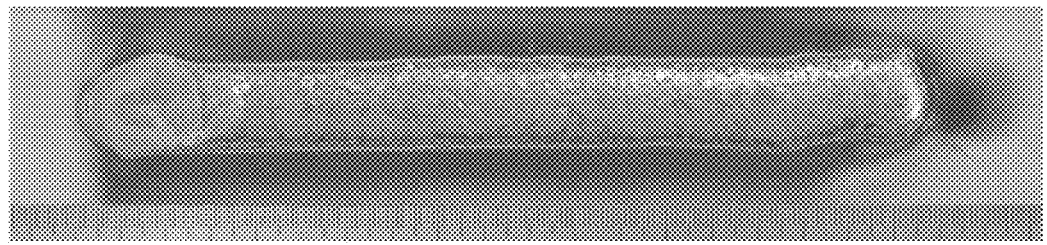
FIG. 4 is an image illustrating the result of a bead appearance inspection in Examples according to the present invention.
Figure 5:
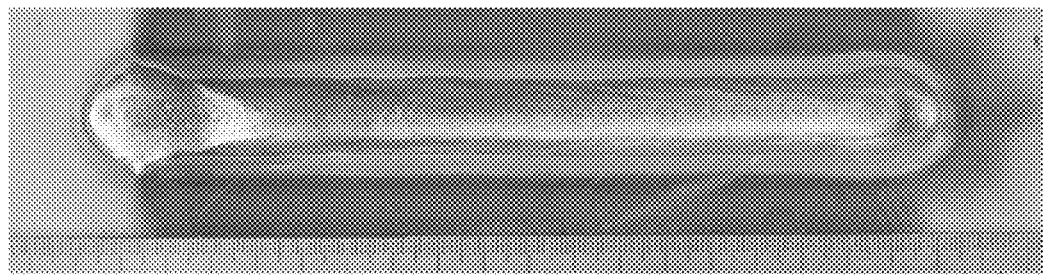
FIG. 5 is an image illustrating the result of a bead appearance inspection in Examples according to the present invention.

| Flow Volume of Shielding Gas (L/min) | Flow Rate of Shielding Gas (m/min) | Distance (mm) | Result | Pass/Fail |
|---|---|---|---|---|
| 100 | 2.0 | 30 | Bead Oxidation (FIG. 4) | X |
| 80 | 1.6 | 25 | Satisfactory | ○ |
| 80 | 1.6 | 20 | Satisfactory | ○ |
| 70 | 1.4 | 15 | Satisfactory | ○ |
| 70 | 1.4 | 13 | Satisfactory (FIG. 5) | ○ |
| 30 | 0.6 | 8 | Satisfactory | ○ |
| 30 | 0.6 | 3 | Satisfactory | ○ |
| 10 | 0.2 | 2 | Satisfactory | ○ |

It was verified from Table 4 that the distance from the nozzle lower end to the base metal surface can be controlled to be 25 mm or less by controlling the flow rate of the shielding gas blown from the nozzle lower end to the base metal to be in a range of 0.2 to 2 (m/sec).

Second Embodiment

Next, a second embodiment to which the present invention is applied will be described. In this embodiment, the welding apparatus used in the hybrid welding method according to the first embodiment can be used. However, this embodiment is different from the first embodiment in a part of the welding torch and the hybrid welding method. Accordingly, the description of the same configurations of the welding torch and the same portions of the hybrid welding method as those of the first embodiment will not be repeated.

Figure 6:
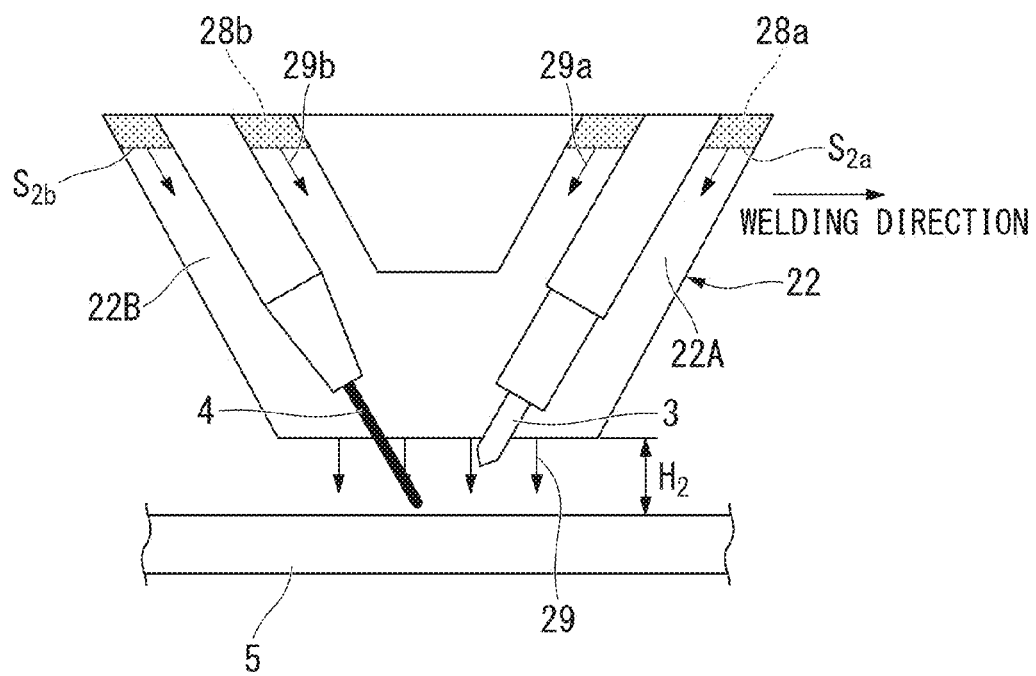
FIG. 6 is an enlarged view illustrating a welding torch and a distal end portion of a nozzle main body used in a second embodiment to which the hybrid welding method according to the present invention is applied.

As illustrated in FIG. 6, in a nozzle main body 22 according to the embodiment, a flow channel 22A of a shielding gas 29a for a TIG arc (shielding gas in a TIG axis direction) and a flow channel 22B of a shielding gas 29b for a MIG arc (shielding gas in a MIG axis direction) are provided. In addition, the flow channels 22A and 22B of the shielding gas are provided with shielding gas blowing portions 28a and 28b connected to shielding gas supply sources (not illustrated), respectively. As a result, in the welding torch according to the embodiment, the same kind of shielding gas may be used for a TIG arc and a MIG arc, or different kinds of shielding gases may be used for a TIG arc and a MIG arc.

In the welding torch according to the embodiment, the shielding gas 29a for a TIG arc and the shielding gas 29b for a MIG arc, which have been blown from the shielding gas blowing portions 28a and 28b, pass through the flow channels 22A and 22B along a TIG electrode 3 and a MIG electrode 4 and are blown (reference numeral 29) from a distal end of the nozzle main body 22 to the base metal 5 which is a workpiece, respectively.

As the shielding gas according to the embodiment, the shielding gas described in the first embodiment and the modification example thereof can be used. In addition, the same kind of shielding gas may be used for a TIG arc and a MIG arc, or different kinds of shielding gases may be used for a TIG arc and a MIG arc.

In the embodiment, flow rates $v_1$ and $v_2$ of the shielding gases 29a and 29b which are blown from the shielding gas blowing portions 28a and 28b provided on the distal end side of the nozzle main body 22 are preferably in a range of 0.3 to 3.3 (m/sec), respectively. Further, the flow rate $v_2$ of the shielding gas 29b for a MIG arc is preferably at least 30% or higher of the flow rate $v_1$ of the shielding gas 29a for a TIG arc ($v_2 \geq 0.3 v_1$).

It is not preferable that the flow rates $v_1$ and $v_2$ be lower than 0.3 (m/sec) because a turbulent flow generated by plasma flow collision is predominant in TIG-MIG hybrid welding in which a gas flow is likely to be turbulent due to the collision of plasma flows discharged from both TIG and MIG arcs, external air is introduced thereinto, and a welded part is oxidized. On the other hand, it is also not preferable that the flow rates $v_1$ and $v_2$ be higher than 3.3 (m/sec) because the shielding gas flow becomes turbulent due to an excessively high flow rate, external air is introduced thereinto, and a welded part is oxidized.

In addition, it is not preferable that the flow rate $v_2$ be lower than 30% of the flow rate $v_1$ because an arc pressure on the MIG side is excessively lower than an arc pressure on the TIG side; as a result, a phenomenon in which a molten pool flows away backward is predominant and a bead is likely to be irregular.

On the other hand, when the flow rates $v_1$ and $v_2$ are in the above-described range, respectively, and the flow rate $v_2$ is 30% or higher of the flow rate $v_1$, as illustrated in FIG. 6, a distance $H_2$ from the lower end of the nozzle main body 22 to the surface of the base metal 5 can be controlled to be 25 mm or less (in other words, under a condition that the flow rate of the shielding gas is in the appropriate range, the distance $H_2$ can be controlled to be 25 mm or less.).

When cross-sectional areas of the flow channels 22A and 22B (in FIG. 6, areas of the bottoms of the shielding gas blowing portions 28a and 28b) are defined as areas $S_{2a}$ and $S_{2b}$ of gas blowing surfaces as illustrated in FIG. 6, specific examples of the gas flow volumes and the gas flow rates ($v_1$ and $v_2$) are shown in Table 5 below.

TABLE 5

| Shielding Gas System | Area of Gas Blowing Surface (mm²) | Gas Flow Volume (L/min) | Gas Flow Rate (m/sec) |
| --- | --- | --- | --- |
| Blowing Portion 28a (TIG Axis Direction) | 286 ($S_{2a}$) | 5 to 57 | 0.3 to 3.3 ($v_1$) |
| Blowing Portion 28b (MIG Axis Direction) | 248 ($S_{2b}$) | 5 to 49 | 0.3 to 3.3 ($v_2$) ($v_2 \geq 0.3 v_1$) |

Next, a hybrid welding method according to the embodiment will be described.

First, the shielding gases are supplied from the shielding gas supply sources (not illustrated) to the shielding gas blowing portions 28a and 28b and are transmitted to the flow channels 22A and 22B, respectively. The flow rates $v_1$ and $v_2$ of the shielding gases 29a and 29b are controlled to be in a range of 0.3 to 3.3 (m/sec), and the flow rate $v_2$ is controlled to be at least 30% or higher of the flow rate $v_1$. In addition, the height of the welding torch is controlled such that the distance $H_2$ from the lower end of the nozzle main body 22 to the surface of the base metal 5 is 25 mm or less. Next, while blowing the shielding gas from the distal end of the nozzle main body 22 to the base metal 5 which is a workpiece, TIG arcs are continuously generated by operating the welding power source 6 to apply a welding current (TIG current) between the tungsten electrode 3 and the base metal 5, and MIG arcs are continuously generated by operating the welding power source 7 to apply a welding current (MIG current) between the welding wire 4 and the base metal 5, thereby welding the base metal.

According to the hybrid welding method of the embodiment, the same effects as those in the above-described first embodiment can be obtained. In addition, by using different kinds of shielding gases for a TIG arc and a MIG arc, the shielding gas effect can be directly obtained immediately below the arcs with mixed gas having an arbitrary composition without mixing the shielding gases in advance.

More specifically, by allowing the shielding gases to flow at different flow rates for a TIG arc and a MIG arc, a difference in arc pressure can be made between the TIG arc and the MIG arc. In addition, by allowing the shielding gases to flow at different flow rates in the respective arc axis directions, the flows of the shielding gases can be formed along plasma flows, and a welded part can be efficiently protected even with low flow rates. Further, when different kinds of shielding gases are used, the gas composition which works on a welded part can be arbitrarily changed by allowing the respective gases to flow at different flow rates.

Modification Example of Second Embodiment

In the example of the hybrid welding method according to the second embodiment, the tungsten electrode (TIG electrode) 3 and the welding wire (MIG electrode) 4 are disposed inside the nozzle main body 22 of the welding torch, but the present invention is not limited thereto. For example, a configuration may be adopted in which the leading TIG arc and the trailing MIG arc are generated by disposing a welding torch (TIG welding torch), which includes a nozzle main body where the tungsten electrode is disposed, and a welding torch (MIG welding torch), which includes a nozzle main body where the welding wire is disposed, in front and back portions in the welding direction.

In the above-described case where the leading TIG welding and the trailing MIG welding are configured using different welding torches, an angle, which is formed between a central axis of the TIG welding torch a normal line of the base metal when a base end side of the TIG welding torch is inclined toward a traveling direction with respect to a welding direction, is defined as a torch angle α (refer to FIG. 2). In addition, an angle, which is formed between a central axis of the MIG welding torch and a normal line of the base metal when a base end side of the MIG welding torch is inclined toward a side opposite the traveling direction with respect to the welding direction, is defined as a torch angle β (refer to FIG. 2).

Third Embodiment

Next, a third embodiment to which the present invention is applied will be described. In this embodiment, the welding apparatus used in the hybrid welding method according to the first and second embodiments can be used. However, this embodiment is the same as the first and second embodiments in that a part of the welding torch and the hybrid welding method. Accordingly, the description of the same configurations of the welding torch and the same portions of the hybrid welding method as those of the first and second embodiments will not be repeated.

Figure 7A:
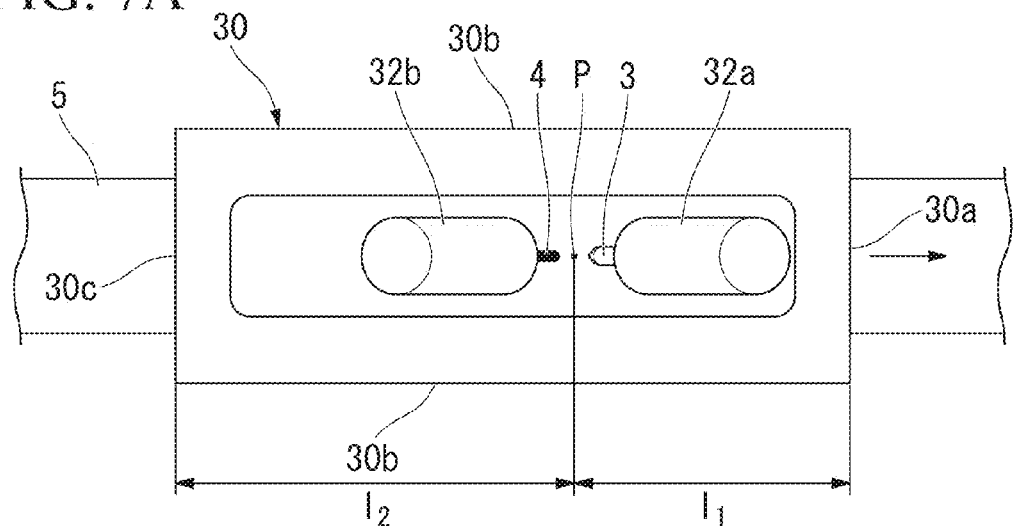
FIG. 7A is a plan view illustrating a distal end portion of a nozzle main body used in a third embodiment to which the hybrid welding method according to the present invention is applied.
Figure 7B:
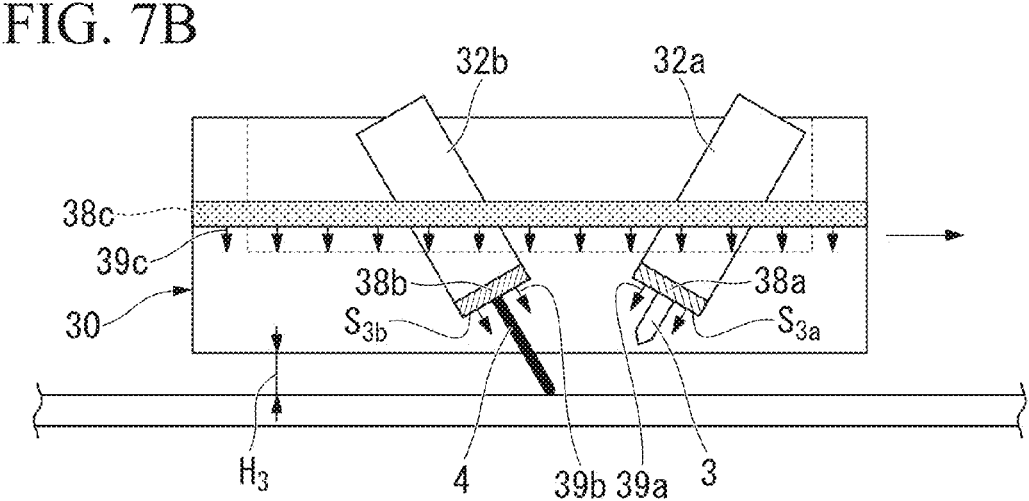
FIG. 7B is a side view illustrating the third embodiment to which the hybrid welding method according to the present invention is applied.
Figure 7C:
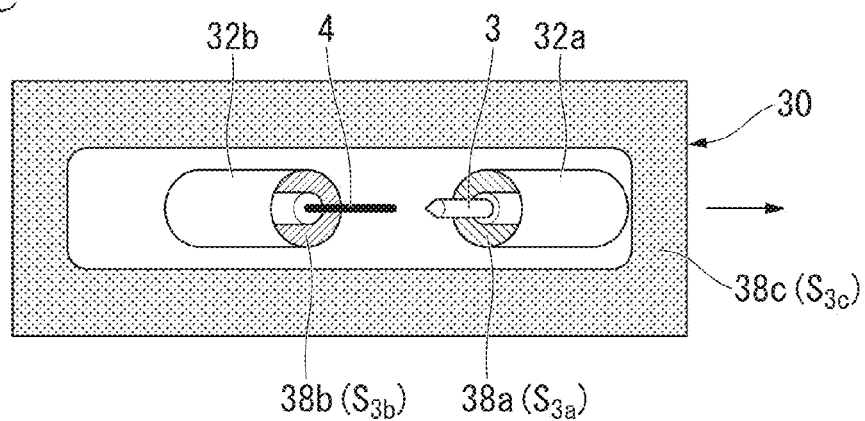
FIG. 7C is a bottom view illustrating the third embodiment to which the hybrid welding method according to the present invention is applied.

As illustrated in FIGS. 7A to 7C, the welding torch according to the embodiment is provided with a shielding box (shielding member) 30 which surrounds a nozzle main body 32a and a nozzle main body 32b, in the configuration (the above-described modification example of the second embodiment) in which the leading TIG arc and the trailing MIG arc are generated by disposing a welding torch (TIG welding torch), which includes the nozzle main body 32a where the tungsten electrode 3 is disposed, and a welding torch (MIG welding torch), which includes the nozzle main body 32b where the welding wire 4 is disposed, in front and back portions in the welding direction.

As illustrated in FIG. 7A, the shielding box 30 is a cylindrical member including: a front wall 30a that is provided on a front side in the welding direction to be perpendicular to the welding direction; a back wall 30c that is provided on a back side in the welding direction to be perpendicular to the welding direction; and a pair of side walls 30b and 30b that are provided parallel to the welding direction. This shielding box 30 is configured to cover a space above a surface of a welded part of the base metal 5.

In addition, the shielding box 30 is provided such that a shielding gas blowing portion 38c connected to a shielding gas supply source (not illustrated) surrounds the nozzle main body 32a and the nozzle main body 32b. As a result, in the welding torch according to the embodiment, a shielding gas 39c can be blown to the surface of the base metal 5 inside the shielding box 30. Therefore, particularly, after welding, a welded part can be protected by the shielding gas (refer to FIG. 7B).

It is preferable that a positional relationship between the shielding box 30 and the nozzle main bodies 32a and 32b satisfy an expression of $l_1 < l_2$ in which, as illustrated in FIG. 7A, $l_1$ denotes the distance from the front wall 30a to a welded part P in the shielding box 30 and $l_2$ denotes the distance from the welded part P to the back wall 30c in the shielding box 30.

In the welding torch according to the embodiment, a shielding gas blowing portion 38a which blows a shielding gas 39a for a TIG arc is provided on a distal end side of the nozzle main body 32a of the TIG welding torch, and a shielding gas blowing portion 38b which blows a shielding gas 39b for a MIG arc is provided on a distal end side of the nozzle main body 32b of the MIG welding torch. The shielding gas 39a for a TIG arc and the shielding gas 39b for a MIG arc, which have been blown from the shielding gas blowing portions 38a and 38b, are blown from the distal ends of the nozzle main bodies 32a and 32b to the base metal 5 which is a workpiece along the TIG electrode 3 and the MIG electrode 4.

As the shielding gas 39c which is blown from the shielding gas blowing portion 38c provided in the shielding box 30 according to the embodiment, the shielding gas described in the first and second embodiments can be used. In addition, the same kind of shielding gas may be used for a TIG arc and a MIG arc, or different kinds of shielding gases may be used for a TIG arc and a MIG arc.

In the embodiment, a flow rate $v_1$ of the shielding gas 39a which is blown from the shielding gas blowing portion 38a provided on the distal end side of the nozzle main body 32a is preferably in a range of 0.5 to 5 (m/sec). In addition, a flow rate $v_2$ of the shielding gas 39b which is blown from the shielding gas blowing portion 38b provided on the distal end side of the nozzle main body 32b is preferably in a range of 0.5 to 5 (m/sec). Further, the flow rate $v_2$ of the shielding gas 39b for a MIG arc is preferably at least 30% or higher of the flow rate $v_1$ of the shielding gas 39a for a TIG arc ($v_2 \geq 0.3 v_1$).

Further, in the embodiment, a flow rate $v_3$ of the shielding gas 39c which is blown from the shielding gas blowing portion 38c provided in the shielding box 30 is preferably 0.05 (m/sec) or higher.

In the embodiment, as illustrated in FIG. 7B, a distance $H_3$ from a lower end of the shielding box 30 to the surface of the base metal 5 is preferably 15 mm or less.

Here, in a hybrid welding method in which the welding torch according to the embodiment is used, the condition that the distance $H_3$ from the lower end of the shielding box 30 to the surface of the base metal 5 is 15 mm or less is satisfied, and the flow rate $v_3$ of the shielding gas 39c which is blown from the shielding gas blowing portion 38c provided in the shielding box 30 is controlled to be 0.05 (m/sec) or higher. As a result, even if the flow rate $v_1$ of the shielding gas 39a for a TIG arc and the flow rate $v_2$ of the shielding gas 39b for a MIG arc do not satisfy the above-described flow rate condition, satisfactory welding can be carried out.

That is, even if the shielding gas 39a for a TIG arc and the shielding gas 39b for a MIG arc are not used at all (even if only the shielding gas 39c from the shielding box 30 is used), satisfactory welding can be carried out.

As illustrated in FIGS. 7A to 7C, when cross-sectional areas of the nozzle main bodies 32a and 32b (areas of the bottoms of the shielding gas blowing portions 38a and 38b) are defined as areas $S_{3a}$ and $S_{3b}$ of gas blowing surfaces and when an area of the bottom of the shielding gas blowing portion 38c provided in the shielding box 30 is defined as an area $S_{3c}$ of a gas blowing surface, specific examples of the gas flow volumes and the gas flow rates ($v_1$, $v_2$, and $v_3$) are shown in Table 6 below.

TABLE 6

| Shielding Gas System | Area of Gas Blowing Surface (mm²) | Gas Flow Volume (L/min) | Gas Flow Rate (m/sec) |
| --- | --- | --- | --- |
| Blowing Portion 38a (For TIG Arc) | 110 ($S_{3a}$) | 3 to 33 | 0.5 to 5.0 ($v_1$) |
| Blowing Portion 38b (For MIG Arc) | 150 ($S_{3b}$) | 5 to 45 | 0.5 to 5.0 ($v_2$) ($v_2 \geq 0.3 v_1$) |
| Blowing Portion 38c (Shielding Box) | 16500 ($S_{3c}$) | 50 or more | 0.05 or higher ($v_3$) |

Next, a hybrid welding method according to the embodiment will be described.

First, the shielding gases are supplied from the shielding gas supply sources (not illustrated) to the shielding gas blowing portions 38a and 38b, and the flow rates $v_1$ and $v_2$ of the shielding gases 39a and 39b are controlled to be in the appropriate range, respectively. Further, the flow rate $v_2$ is controlled to be at least 30% or higher of the flow rate $v_1$. Meanwhile, the height of the welding torch is controlled such that the distance $H_3$ from the lower end of the shielding box 30 to the surface of the base metal 5 is 15 mm or less. Next, the shielding gas 39c is blown at the flow rate $v_3$ of 0.05 (m/sec) or higher from the shielding gas blowing portion 38c provided in the shielding box 30 to the base metal 5 which is a workpiece. Next, TIG arcs are continuously generated by operating the welding power source 6 to apply a welding current (TIG current) between the tungsten electrode 3 and the base metal 5, and MIG arcs are continuously generated by operating the welding power source 7 to apply a welding current (MIG current) between the welding wire 4 and the base metal 5, thereby welding the base metal.

According to the hybrid welding method of the embodiment, the same effects as those in the above-described first and second embodiments can be obtained. In addition, a condition that the distance $H_3$ from the lower end of the shielding box 30 to the surface of the base metal 5 is 15 mm or less is satisfied, and the flow rate $v_3$ of the shielding gas 39c which is blown from the shielding gas blowing portion 38c provided in the shielding box 30 is controlled to be 0.05 (m/sec) or higher. As a result, even if the flow rate $v_1$ of the shielding gas 39a for a TIG arc and the flow rate $v_2$ of the shielding gas 39b for a MIG arc do not satisfy the above-described flow rate condition, satisfactory welding can be carried out.

Modification Example of Third Embodiment

In the example of the hybrid welding method according to the third embodiment, the shielding box 30 is a cylindrical member including the front wall 30a, the back wall 30c, and the pair of side walls 30b and 30b, but the present invention is not limited thereto. For example, a configuration may be adopted in which at least the pair of side walls 30b and 30b are provided by removing either or both the front wall 30a and the back wall 30c of the shielding box 30.

Hereinafter, a specific example will be described.
(Verification Test 2)

The leading TIG welding and the trailing MIG welding were carried out using different welding torches, in which the torch angle of the leading TIG welding torch was set to α and the torch angle of the trailing MIG welding torch was set to β. Using a welding apparatus including the welding torches and a shielding box, base metal formed of common stainless steel (SUS304) was welded. As welding conditions, conditions shown in Table 7 were used. In addition, the results of a bead appearance inspection which vary depending on the inter-arc distance L are shown in Table 8.

TABLE 7

| | |
|---|---|
| Leading TIG Current | 350 A |
| Trailing MIG Current | 270 A |
| Welding Speed | 30 cm/min |
| Inter-Arc Distance L | 2 to 25 mm |
| Kind, Flow Volume, and Flow Rate of TIG Shielding Gas | Ar, 15 L/min, 2.3 m/min |
| Kind, Flow Volume, and Flow Rate of MIG Shielding Gas | Ar, 25 L/min, 2.8 m/min |
| Kind, Flow Volume, and Flow Rate of Gas in Shielding Box | Ar, 70 L/min, 0.07 m/min |
| Distance From Nozzle Lower End to Base Metal Surface | 5 mm |
| TIG Arc Length M | 5 mm |
| Torch Angle α | 30° (Traveling Direction Side of Welding Direction is Positive Side) |
| Torch Angle β | −30° (Traveling Direction Side of Welding Direction is Positive Side) |

TABLE 8

Figure 8:
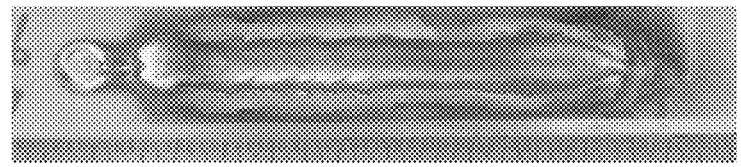
FIG. 8 is an image illustrating the result of a bead appearance inspection in Examples according to the present invention.

| Distance (mm) | Result | Pass/Fail |
|---|---|---|
| 25 | Irregular Bead | X (FIG. 8) |
| 20 | Satisfactory | ○ |

TABLE 8-continued

Figure 9:
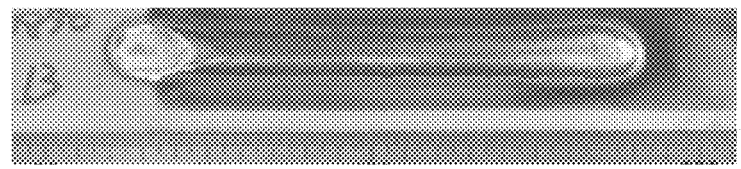
FIG. 9 is an image illustrating the result of a bead appearance inspection in Examples according to the present invention.

| Distance (mm) | Result | Pass/Fail |
|---|---|---|
| 16 | Satisfactory | ○ |
| 12 | Satisfactory | ○ |
| 8 | Satisfactory | ○ |
| 4 | Satisfactory | ○ (FIG. 9) |
| 2 | Satisfactory | ○ |

It was verified from Table 8 that, for stable welding, the absolute value of the inter-arc distance L is required to be within 20 mm.
(Verification Test 3)

The leading TIG welding and the trailing MIG welding were carried out using different welding torches, in which the torch angle of the leading TIG welding torch was set to α and the torch angle of the trailing MIG welding torch was set to β. Using a welding apparatus including the welding torches and the shielding box and using a welding apparatus including the welding torches and not including the shielding box, base metals formed of common stainless steel (SUS304) were welded, respectively. As welding conditions, conditions shown in Table 9 were used. In addition, the results of a bead appearance inspection which vary depending on whether there is a shielding box or not are shown in Table 10.

TABLE 9

| | |
|---|---|
| Leading TIG Current | 350 A |
| Trailing MIG Current | 270 A |
| Welding Speed | 30 cm/min |
| Inter-Arc Distance L | 12 mm |
| Kind, Flow Volume, and Flow Rate of TIG Shielding Gas | Ar, 0 to 20 L/min, 0 to 3.0 m/min |
| Kind, Flow Volume, and Flow Rate of MIG Shielding Gas | Ar, 0 to 30 L/min, 0 to 3.3 m/min |
| Whether or Not There is Shielding Box: Kind, Flow Volume, and Flow Rate of Shielding Gas | None: Present: Ar, 100 L/min, 0.1 m/min |
| Distance From Nozzle Lower End to Base Metal Surface | 5 mm |
| TIG Arc Length M | 5 mm |
| Torch Angle α | 30° (Traveling Direction Side of Welding Direction is Positive Side) |
| Torch Angle β | −30° (Traveling Direction Side of Welding Direction is Positive Side) |

TABLE 10

Figure 10:
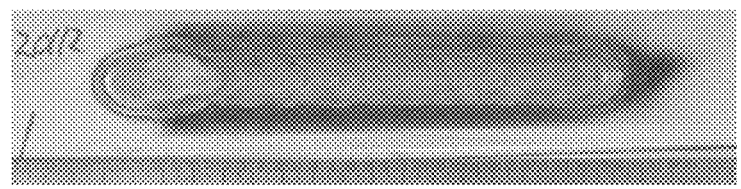
FIG. 10 is an image illustrating the result of a bead appearance inspection in Examples according to the present invention.
Figure 11:
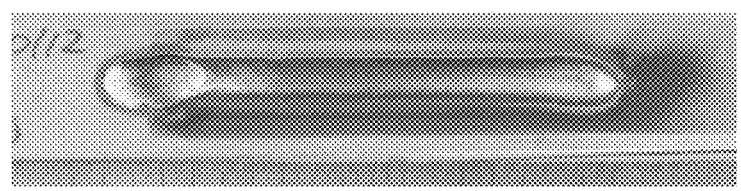
FIG. 11 is an image illustrating the result of a bead appearance inspection in Examples according to the present invention.
Figure 12:
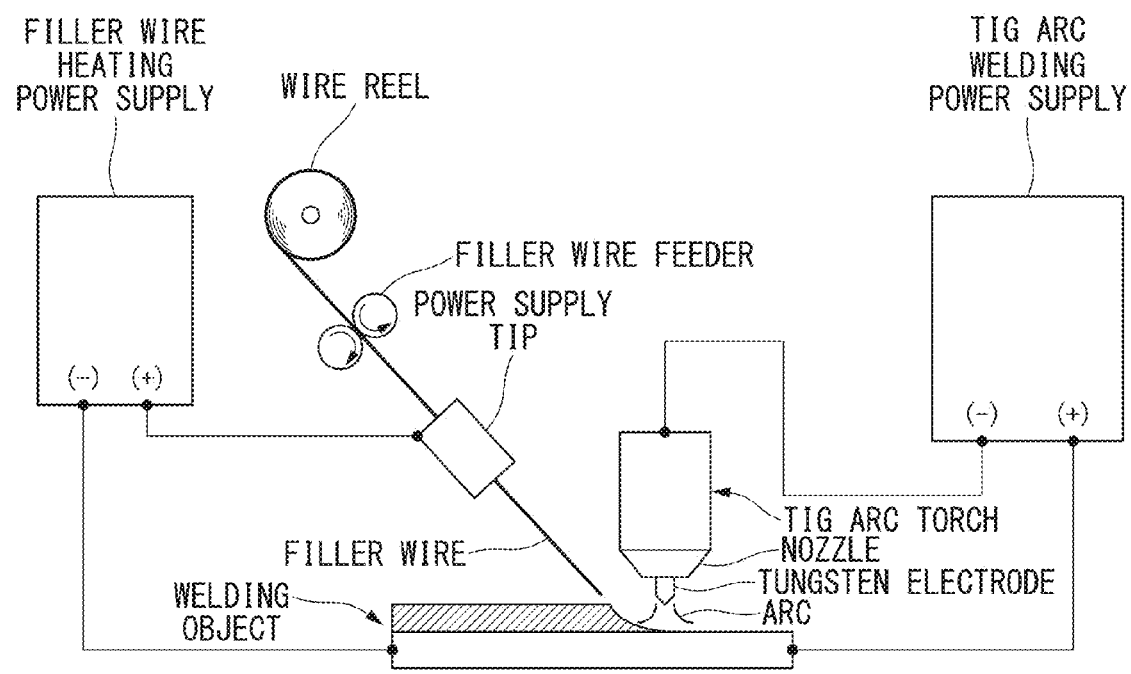
FIG. 12 is a diagram illustrating a configuration of a conventional hot-wire TIG arc welding apparatus of the related art.

| TIG Shielding Gas | MIG Shielding Gas | Shielding Gas in Shielding Box | Result | Pass/Fail |
|---|---|---|---|---|
| Flow Volume: 20 (L/min) Flow Rate: 3.0 (m/min) | Flow Volume: 30 (L/min) Flow Rate: 3.3 (m/min) | None | Bead Oxidation (FIG. 10) | X |
| Flow Volume: 20 (L/min) Flow Rate: 3.0 (m/min) | Flow Volume: 30 (L/min) Flow Rate: 3.3 (m/min) | Flow Volume: 100 (L/min) Flow Rate: 0.1 (m/min) | Satisfactory | ○ |
| 0 | 0 | Flow Volume: 100 (L/min) Flow Rate: 0.1 (m/min) | Satisfactory (FIG. 11) | ○ |
| 0 | 0 | Flow Volume: 50 (L/min) Flow Rate: 0.05 (m/min) | Satisfactory | ○ |

TABLE 10-continued

| TIG Shielding Gas | MIG Shielding Gas | Shielding Gas in Shielding Box | Result | Pass/Fail |
|---|---|---|---|---|
| 0 | 0 | Flow Volume: 30 (L/min) Flow Rate: 0.03 (m/min) | Bead Oxidation | X |

It was verified from Table 10 that a satisfactory welding result can be obtained by using the welding apparatus including the shielding box. In addition, it was verified that, even if the shielding gas for a TIG arc and the shielding gas for a MIG arc are not used at all, satisfactory welding can be carried out by controlling the distance from the lower end of the shielding box to the surface of the base metal to be 15 mm or less and controlling the flow rate of the shielding gas blown from the shielding box to be 0.05 (m/sec) or higher.

The technical scope of the present invention is not limited to the above-described embodiment, and various modifications can be made within a range not departing from the scope of the present invention. For example, in the example of the welding torch 1 included in the welding apparatus according to the first embodiment, the nozzle main body 2 has a single structure. However, the nozzle main body may have multiple structures in which the shielding gas according to the present invention is used only in an inner nozzle and inert gas is used in an outer nozzle.

In addition, in the welding method according to the present invention, flat position welding is preferable, but the present invention is not limited thereto. The welding method according to the present invention is applicable to all position welding.

Further, the shape of a welded joint is not particularly limited, and the welding method according to the present invention is applicable to lap fillet welding and the like. In particular, in narrow gap butt welding, as compared to the MIG welding of the related art, weld penetration is increased and the wettability thereof can be improved. As compared to the TIG welding of the related art, the deposition rate can be increased and productivity can be improved.

INDUSTRIAL APPLICABILITY

The hybrid welding method according to the present invention is applicable to products such as nuclear vessels and various pressure vessels to which only TIG welding was able to be applied in the past from the viewpoints of toughness and spatter.

In addition, recently, wire makers and welding machine makers have developed clean MIG welding methods as methods of reducing the amount of oxygen in welding metal of steel-based materials. The hybrid welding method according to the present invention can be adopted as one of the above methods.

REFERENCE SIGNS LIST

1: WELDING TORCH (WELDING TORCH FOR HYBRID WELDING)
2: NOZZLE MAIN BODY
3: TUNGSTEN ELECTRODE (TIG ELECTRODE)
4: WELDING WIRE (MIG ELECTRODE)
5: BASE METAL
6, 7: WELDING POWER SOURCE
8: SHIELDING GAS BLOWING PORTION
9: SHIELDING GAS
30: SHIELDING BOX (SHIELDING MEMBER)
H: DISTANCE FROM LOWER END OF NOZZLE MAIN BODY TO SURFACE OF BASE METAL
L: INTER-ARC DISTANCE

The invention claimed is:

1. A hybrid welding method comprising generating a TIG arc on a leading side in a welding direction and generating a MIG arc on a trailing side in the welding direction to weld a base metal, wherein a TIG current is set to be higher than a MIG current so as to continuously generate arcs in a TIG electrode and a MIG electrode, and an absolute value of a distance from an intersection between a central axis of the TIG electrode and a surface of the base metal to an intersection between a central axis of the MIG electrode and the surface of the base metal is 20 mm or less; wherein the base metal is welded while covering a welded part, which is formed on the surface of the base metal, with a shielding member which is provided to surround a part or the entire periphery of the nozzle main body.

2. The hybrid welding method according to claim 1, wherein the TIG electrode and the MIG electrode are disposed inside a nozzle main body, a distance from a lower end of the nozzle main body to the surface of the base metal is maintained to be 25 mm or less, and the TIG arc and the MIG arc are generated while blowing a shielding gas from the lower end of the nozzle main body to the surface of the base metal.

3. The hybrid welding method according to claim 2, wherein in the nozzle main body, the shielding gas is supplied from a base end side to a distal end side of each of the TIG electrode and the MIG electrode along the TIG electrode and the MIG electrode.

4. The hybrid welding method according to claim 2, wherein the TIG electrode and the MIG electrode are disposed inside one nozzle main body.

5. The hybrid welding method according to claim 1, wherein the TIG electrode and the MIG electrode are disposed inside different nozzle main bodies, a distance from a lower end of the nozzle main body to the surface of the base metal is maintained to be 25 mm or less, and the TIG arc and the MIG arc are generated while blowing a shielding gas from the lower end of the nozzle main body to the surface of the base metal.

6. The hybrid welding method according to claim 1, wherein as the shielding gas, gas containing 25% or more of He and a balance of argon gas is used.

7. The hybrid welding method according to claim 1, wherein as the shielding gas, gas containing 3% to 9% of hydrogen and a balance of argon gas is used.

8. The hybrid welding method according to claim 1, wherein as the shielding gas, gas containing 3% to 9% of hydrogen, 25% or more of He, and a balance of argon gas is used.

9. The hybrid welding method according to claim 1, wherein as the shielding gas, gas containing 3% to 9% of hydrogen and a balance of helium gas is used.

10. The hybrid welding method according to claim 2, wherein the same kind of shielding gas is used for the TIG arc and the MIG arc.

11. The hybrid welding method according to claim 2, wherein different kinds of shielding gases are used for the TIG arc and the MIG arc.

12. The hybrid welding method according to claim 1, wherein the base metal is welded while blowing the shielding gas of the hybrid welding method to the surface of the base metal between the nozzle main body and the shielding member.

13. The hybrid welding method according to claim 1, wherein a distance from a lower end of the shielding member to the surface of the base metal is maintained to be 15 mm or less.

14. The hybrid welding method according to claim 1, wherein a total angle (a1+AP) of a torch angle a and a torch angle 3 is in a range of 300 to 1200, the torch angle a being an angle formed between a central axis of a TIG welding torch and a normal line of the base metal when a base end side of the TIG welding torch is inclined toward a traveling direction with respect to a welding direction, the torch angle R being an angle formed between a central axis of a MIG welding torch and a normal line of the base metal when a base end side of the MIG welding torch is inclined toward a side opposite the traveling direction with respect to the welding direction.

15. The hybrid welding method according to claim 1, wherein a pulsed current is added to trailing MIG welding.

16. A welding torch for hybrid welding used in the hybrid welding method according to claim 1, the welding torch comprising: a TIG electrode; a MIG electrode that is provided on a trailing side of the TIG electrode in a welding direction; and a nozzle main body in which the TIG electrode and the MIG electrode are accommodated, wherein a distance from a lower end of the nozzle main body to a surface of base metal is 25 mm or less; further comprising a shielding member that is provided to surround a part or the entire periphery of the nozzle main body, wherein a distance from a lower end of the shielding member to the surface of the base metal, which ranges between the nozzle main body and the shielding member, is 15 mm or less.

17. The welding torch for hybrid welding according to claim 16, wherein a flow path of a shielding gas for a TIG arc and a flow path of a shielding gas for a MIG arc are provided inside the nozzle main body.

18. The welding torch for hybrid welding according to claim 16, wherein the shielding member is provided with a shielding gas blowing portion to protect a welded part formed on the surface of the base metal.

* * * * *